United States Patent [19]

Müller

[11] 3,762,232
[45] Oct. 2, 1973

[54] LOW SLIP BELT DRIVE

[75] Inventor: Friedrich Müller, Halstenbek, Germany

[73] Assignee: Aristo-Werke Dennert & Pape KG, Hamburg, Germany

[22] Filed: Sept. 20, 1971

[21] Appl. No.: 181,936

[30] Foreign Application Priority Data
Sept. 24, 1970 Germany.................. P 20 47 092.2

[52] U.S. Cl .............................. 74/231 M, 74/258
[51] Int. Cl........................... F16g 1/00, F16g 13/02
[58] Field of Search............. 74/443, 231 M, 242.8, 74/258

[56] References Cited
UNITED STATES PATENTS
3,016,757  1/1962  Kornylak .......................... 74/443 X
3,659,112  4/1972  Stedman ............................. 74/258

FOREIGN PATENTS OR APPLICATIONS
235,490  9/1908  Germany.......................... 74/231 M Primary Examiner—Leonard H. Gerin
Attorney—Walter Becker

[57] ABSTRACT

A low slip belt drive in which a thin, highly preloaded steel belt is wound around a drive wheel and a reversing wheel, and in which an elastic tensioning element forms a belt lock aad also dampens vibrations originating in the steel belt and drive.

11 Claims, 3 Drawing Figures

PATENTED OCT 2 1973 3,762,232

"A"

Inventor:
Friedrich Müller
By

LOW SLIP BELT DRIVE

The present invention relates to a belt drive for a low slip translation of unsteady, rotary movements of a drive wheel, occurring in alternate directions, into corresponding translatory movements.

For the driving of precision machines, especially measuring and drafting machines, drives are very frequently required with which rotary movements may be converted into translatory movements in as slip free a manner as possible. The chains or cable lines generally used for this type of drive do not produce the necessary precision and rigidity, in which instance, the necessary high fundamental frequency of the drive system cannot be obtained.

It is known to use toothed belts for the drive of measuring devices and precision measuring machines, which require a drive free from play. Such belts are made of a material having a high elasticity, which, because of its elongation, disadvantageously affects the operating precision and the sensitivity to vibration of the machines. Longitudinal vibrations will occur particularly if the natural frequency of the driven machine coincides with the frequency of the drive stepping motor, the use of which motor over a direct current drive with an automatic control system, has advantages with regard to inexpensiveness and freedom from disorders.

It is an object of the present invention to produce a belt drive which is inexpensive and has little slip while having as low a weight as possible.

It is a further object of the invention to provide a belt drive as set forth in the preceding paragraph in which the natural frequency of the belt drive will be as high as possible, while its natural vibrations will be damped, and the belt drive will prevent the still existing agitation frequency of the drive from reaching the drawing tool.

These and other objects and advantages of the invention will appear more clearly from the following specification in connection with the accompanying drawing, in which.

Figure 1:
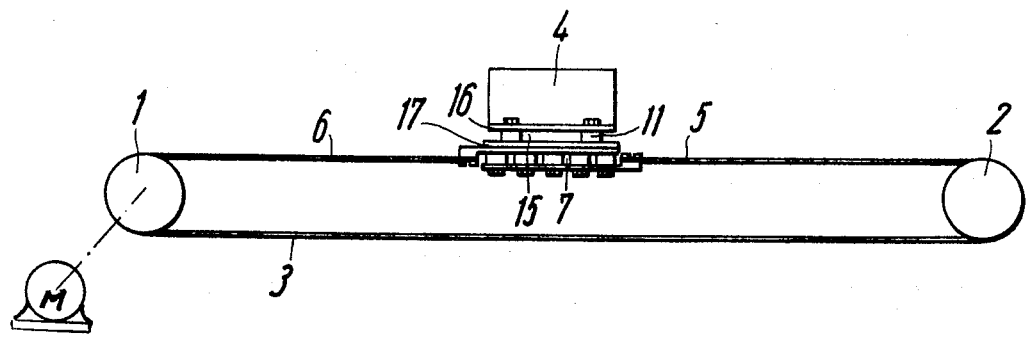
FIG. 1 is a diagrammatic side view of a belt drive according to the invention, which has a mass coupled thereto.

The invention is characterized primarily in that a belt drive of the above mentioned type comprises a thin steel belt under high preload, and that said belt drive also comprises an elastic tensioning element operating in the direction of the movement of the belt. This elastic tensioning element has a vibration-damping characteristic for the vibrations generated by the steel belt and the drive.

According to a preferred embodiment of the invention, the tensioning element forms a belt lock.

The belt consists preferably of spring steel having a maximum thickness of 0.2 mm.

According to a further preferred embodiment of the invention, the belt lock comprises elastic elements which are greatly self-damping.

Referring now to the drawing in detail, the belt drive illustrated therein comprises primarily a drive wheel 1, a reversing wheel 2, a belt 3, and a coupled mass 4. The belt 3 is a spring steel belt which is looped around the drive wheel 1 and the reversing wheel 2. The two free ends 5, 6 of the spring steel belt 3 are connected to one another by means of the belt lock 7.

Figure 2:
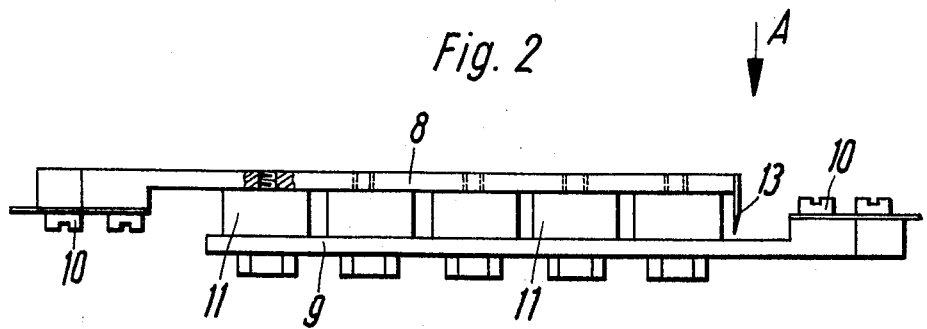
FIG. 2 is an enlargement of a belt lock according to the invention.
Figure 3:
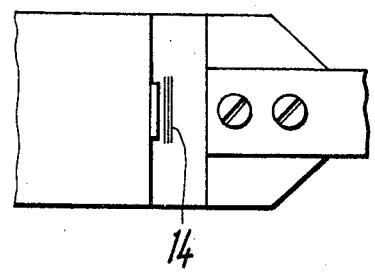
FIG. 3 shows a top view of the right-hand portion of FIG. 2 as seen in the direction of the arrow A.

This belt lock 7 primarily comprises two thin steel plates 8, 9 (FIG. 2) which are substantially parallel to each other and which are securely connected with the ends 5, 6 of the spring steel belt 3. The connection between the steel belt 3 and the plates 8, 9 may be accomplished by means of bolts 10. Between the plates 8, 9 are elastic elements 11 known as rubber-metal damping elements. The damping elements 11 are bolted to the plates 8, 9. An indicator or pointer 13 is fastened to the upper plate 8, said pointer 13 being movable over a corresponding scale 14 (FIG. 3) mounted on the lower plate 9.

The mass 4 is coupled to the steel belt 3 by a damping element 15, which element 15 reduces the transfer of vibrations to the mass 4, which vibrations originate with the motor or the transmission. With drawing machines, this mass comprises primarily the transverse carriage which supports the drawing instrument. The damping element 15 is in principle constructed similarly to the belt lock 7. Damping elements 11 are mounted between an upper plate 16 which is securely connected with the mass 4, and a lower plate 17, which is bolted to the steel belt 3. These damping elements 11 prevent transmission of vibrations from the steel belt 3 to the transverse carriage and the drawing instrument.

When assembling the belt drive, the steel belt 3 is placed over drive wheel 1 and reversing wheel 2. The materials of these component parts are so selected that a good static friction results with a corresponding preload. During the pretensioning or preloading operation, the damping elements 11 are subjected to shearing forces. In this connection, the upper plate 8 is displaced in relation to the lower plate 9 so that the damping elements 11 have a tendency to assume an oblique position. The pointer 13 indicates upon the scale 14 the degree of obliqueness and thereby the preload on the steel belt 3. The pointer 13 facilitates the adjusting of the proper preload during the mounting of the steel belt 3. Care must be taken to maintain the proper preload, especially when a new belt is placed over the wheels 1 and 2 and the old belt shows fatigue from the numerous deviations on the wheels 1,2.

In order to keep the forces low which tend to distort the steel belt 3, a thin spring steel band 3 is used. A thickness of less than 0.2 mm. has proven to be especially favorable. In this way, planimetric measurements with a precision of ± 0.03 mm. may be attained over measuring length of one meter, provided the preload is sufficiently high. In order to be able to exert a large preload upon the wheels 1, 2, as large a belt width as possible should be chosen. A ratio of belt width to belt thickness of 50:1 or more must be used.

It is, of course, to be understood that the present invention is, by no means, limited to the specific showing in the drawing but also comprises any modifications within the scope of the appended claims.

What I claim is:

1. A belt drive for converting unsteady rotary movements of a drive wheel which alternate in their direction of rotation into corresponding translatory movements, which includes: drive wheel means, driven wheel means, a finite relatively thin preloaded steel belt looped around said driving and driven wheel means and having its ends arranged in spaced relationship to each other, and tensioning means comprising damping means interposed between and connected to the ends of said belt and adapted to dampen vibrations originating with said steel belt and said driving wheel means, said tensioning means forming a belt lock.

2. A belt drive according to claim 1, in which the steel belt is of spring steel and has a maximum thickness of 0.2 mm.

3. A belt drive according to claim 1, in which said drive wheel means has a surface of high static friction engaged by said steel belt while the latter is under relatively high preload.

4. A belt drive according to claim 1, in which the ratio of the width of the steel belt to the thickness thereof is at least 50:1.

5. A belt drive according to claim 1, in which said belt lock includes elastic means having high self-damping characteristics.

6. A belt drive according to claim 5, in which said elastic means are readily exchangeably arranged.

7. A belt drive according to claim 1, in which the belt lock includes first means carrying a pointer, and second means elastically connected to said first means and carrying a scale, said pointer and said scale being movable relative to each other during the setting of the desired preload to be impacted upon said steel belt to thereby indicate the respective preload imparted upon the belt.

8. A belt drive for converting unsteady rotary movements of a drive wheel which alternate in their direction of rotation into corresponding translatory movements, which includes: drive wheel means, driven wheel means, a finite relatively thin preloaded steel belt looped around said driving and driven wheel means and having its ends arranged in spaced relationship to each other, and tensioning means comprising damping means interposed between and connected to the ends of said belt and adapted to dampen vibrations originating with said steel belt and said driving wheel means, said tensioning means including elastic means formed by combination rubber-metal vibration damping means.

9. A belt drive for converting unsteady rotary movements of a drive wheel which alternate in their direction of rotation into corresponding translatory movements, which includes: drive wheel means, driven wheel means, a finite relatively thin preloaded steel belt looped around said driving and driven wheel means and having its ends arranged in spaced relationship to each other, and tensioning means comprising damping means interposed between and connected to the ends of said belt and adapted to dampen vibrations originating with said steel belt and said driving wheel means, said tensioning means including a plurality of rubber elements arranged in parallel to each other and having vibration damping characteristics.

10. A belt drive according to claim 9, in which said rubber elements are so arranged as to be subjected to shearing stresses which act in the direction of the pulling forces active in the belt during the operation of the latter.

11. A belt drive for converting unsteady rotary movements of a drive wheel which alternate in their direction of rotation into corresponding translatory movements, which includes: drive wheel means, driven wheel means, a finite relatively thin preloaded steel belt looped around said driving and driven wheel means and having its ends arranged in spaced relationship to each other, and tensioning means comprising damping means interposed between and connected to the ends of said belt and adapted to dampen vibrations originating with said steel belt and said driving wheel means, a mass and additional damping means interposed between and connected to said mass and said steel belt.

* * * * *